United States Patent [19]
Sakamoto et al.

[11] Patent Number: 5,130,074
[45] Date of Patent: Jul. 14, 1992

[54] METHOD AND APPARATUS FOR MANUFACTURING A SKIN-COVERED ARTICLE

[75] Inventors: Kunihiko Sakamoto; Terumi Akazawa; Yoshiaki Matsuo; Harumi Suehiro, all of Hiroshima, Japan

[73] Assignees: Kabushiki Kaisha Toyo Seat (Toyo Seat Ltd.), Osaka; Chugoku Kasei Kogyo Kabushiki Kaisha (Chugoku Kasei Kogyo Co., Ltd.), Hiroshima, both of Japan

[21] Appl. No.: 561,546

[22] Filed: Aug. 1, 1990

[30] Foreign Application Priority Data

May 28, 1990 [JP] Japan .................. 2-137668

[51] Int. Cl.⁵ .............................. B29C 67/22
[52] U.S. Cl. .................. 264/259; 264/46.4; 264/46.6
[58] Field of Search .......... 264/46.4, 46.5, 46.6, 264/46.8, 259; 156/79

[56] References Cited

U.S. PATENT DOCUMENTS

| | | | |
|---|---|---|---|
| 3,878,277 | 4/1975 | Velte | 264/46.4 |
| 4,758,294 | 7/1988 | Storch | 264/46.6 |
| 4,824,069 | 4/1989 | Shoji et al. | 264/46.4 |
| 4,824,070 | 4/1989 | Mizuno et al. | 264/46.4 |
| 4,829,644 | 5/1989 | Kondo et al. | 264/46.6 |
| 4,997,356 | 3/1991 | Katagiri | 264/46.4 |
| 5,007,815 | 4/1991 | Shoji | 264/46.4 |

FOREIGN PATENT DOCUMENTS

| | | | |
|---|---|---|---|
| 55-23604 | 6/1980 | Japan . | |
| 61-162329 | 7/1986 | Japan | 264/46.8 |

Primary Examiner—Robert A. Dawson
Assistant Examiner—Allan R. Kuhns
Attorney, Agent, or Firm—Jordan and Hamburg

[57] ABSTRACT

A method for manufacturing a skin-covered article includes setting a skin member having a top portion and a side portion in a mold assembly including an upper mold having a first cavity, a second cavity, and an enclosing projection, and a lower mold having an upper wall and a peripheral portion by covering the skin member over the lower mold with the back surface of the skin member being turned outside, coupling the upper mold and the lower mold to close the first cavity by the top portion to define a pad forming space with the enclosing projection pressing the top portion against the upper wall, and to close the second cavity by the peripheral portion to define a housing space to house the side portion, and introducing pad material into the pad forming space.

12 Claims, 3 Drawing Sheets

METHOD AND APPARATUS FOR MANUFACTURING A SKIN-COVERED ARTICLE

BACKGROUND OF THE INVENTION AND RELATED ART STATEMENT

The present invention relates to a method and apparatus for manufacturing a skin-covered article for use in a car seat, a sofa and the like.

Conventionally, such a skin-covered article has been made by covering a pad member made of foam resin with a skin member having a surface layer made of cloth or the like and a wadding layer made of polyurethane foam, and integrating the pad member and the skin member by adhesive or sewing. To simplify manufacturing of skin-covered article and give a proper hardness to the skin member, the skin member is placed on a lower mold of a mold assembly, foam resin being introduced into a cavity of the mold assembly, so that a part of the foam resin can penetrate into the wadding layer to integrate the skin member with the pad member.

In the above case that the pad member is foamed integrally with the skin member, it is required to set the skin member on a predetermined position precisely and hold the skin member on the predetermined position by fastening end portions with pins, adhesive tapes or the like. Therefore, there are drawbacks that the operation is troublesome, the skin member is damaged or made dirty by a pin or adhesive applied on the adhesive tape.

To solve the above problems, for example, Japanese Unexamined Patent Publication No. 2-8019 discloses an apparatus including a lower mold having a fixed mold corresponding to a peripheral portion of a seat member and a movable mold corresponding to a sitting portion of the seat member, a skin member being placed on the movable mold, foam resin being then introduced into a cavity of the mold assembly with the skin member being held between the movable mold and the fixed mold.

In the above case that the skin member is held between the movable mold and the fixed mold, it is not required to use pins, adhesive tape or the like. Therefore, the skin member can be prevented from being damaged or made dirty. However, it is required to divide the lower mold into two portions and cause one of them to freely move up and down as the movable mold. Therefore, the structure of the mold assembly is more complicated. In addition, it is required to place the skin member on the movable mold in a state in which the movable mold is moved to an upper position, then to move down the movable mold to hold the skin member between the movable mold and the fixed mold, and thereafter to move down the upper mold to close the mold assembly. Therefore, a complicated operation is required before supplying foam resin.

Accordingly, an object of the present invention is to provide a method and apparatus for manufacturing a skin-covered article which have overcome the above-mentioned drawbacks.

SUMMARY OF THE INVENTION

A method for manufacturing a skin-covered article of the present invention comprises the steps of setting a skin member having a top portion and a side portion in a mold assembly including an upper mold having a first cavity, a second cavity, and an enclosing projection, and a lower mold having an upper wall and a peripheral portion by covering the skin member over the lower mold with the back surface of the skin member being turned outside, coupling the upper mold and the lower mold to close the first cavity by the top portion to define a pad forming space with the enclosing projection pressing the top portion against the upper wall, and to close the second cavity by the peripheral portion to define a housing space to house the side portion, introducing pad material into the pad forming space.

Also, an apparatus for manufacturing a skin-covered article comprises an upper mold including a first peripheral portion for defining a first cavity, a second peripheral portion for defining a second cavity, and an enclosing projection, a lower mold including an upper wall for closing the first cavity to define a forming space when the two molds are coupled, and a peripheral portion for closing the second cavity to define a housing space when the two molds are coupled, whereby before the two molds are coupled, a skin member including a top portion and a side portion is set on the lower mold with the top portion being placed on the upper wall, and when the two molds are coupled, the enclosing projection presses the top portion of the skin member against the upper wall of the lower mold and the side portion of the skin member is held in the housing space.

According to the present invention, the skin member is covered over the lower mold with the back surface outside and pressed against the upper wall of the lower mold when the two molds are coupled. Accordingly, the skin member is prevented from being shifted by the supplied pad material. The side portion of the skin member is housed in the housing space which is defined by the second peripheral portion of the upper mold and the peripheral portion of the lower mold when coupling the two molds, and which is outside the forming space. Furthermore, the housing space is sealed by the enclosing projection. Consequently, the pad material supplied in the forming space is prevented from entering in the housing space in which the side portion of the skin member is housed.

This and other objects, features and advantages of the present invention will become more apparent upon a reading of the following detailed description and drawings.

DESCRIPTION OF THE PREFERRED EMBODIMENTS

There will be described embodiments of the present invention with reference to the drawings.

Figure 1:
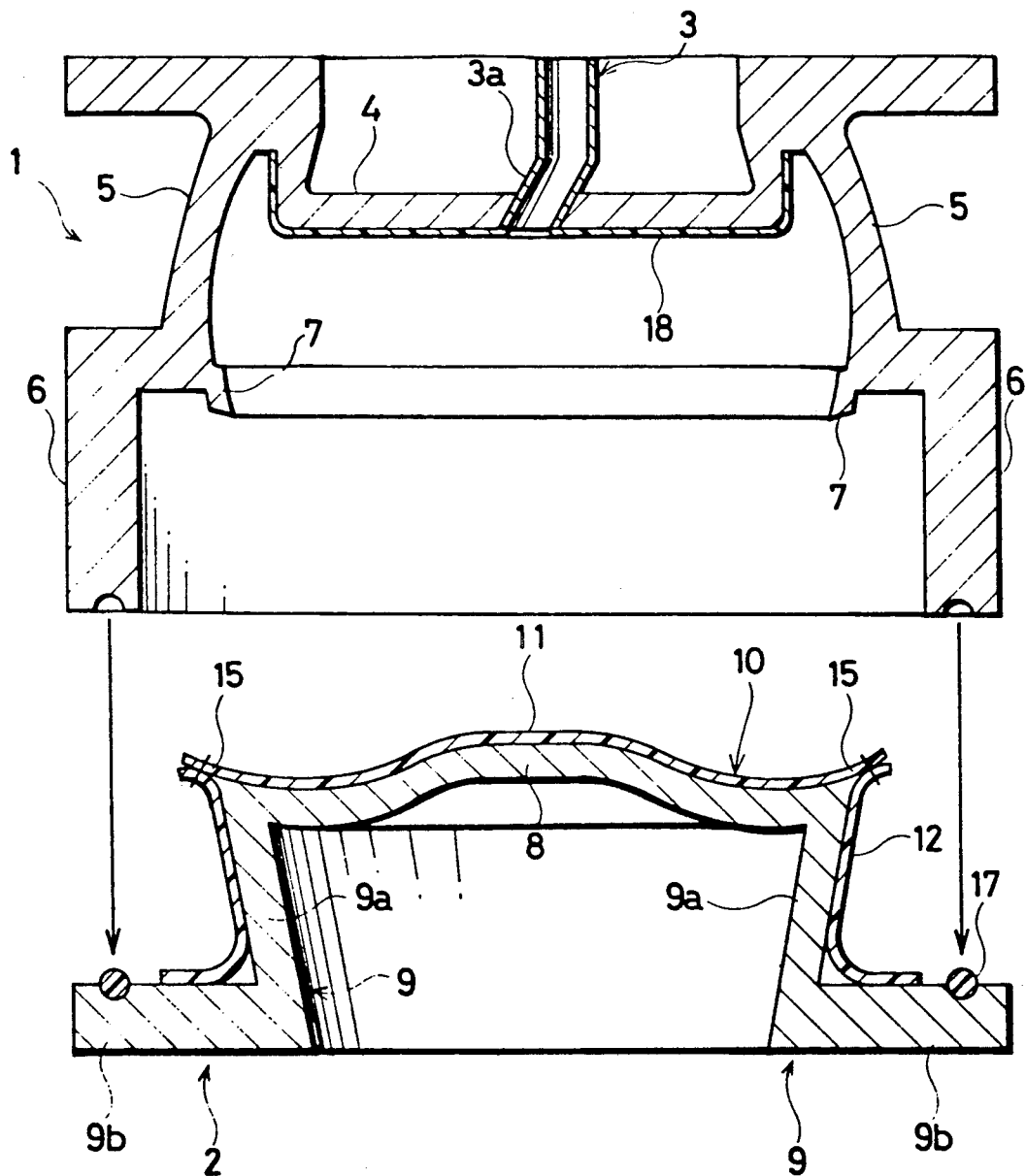
FIG. 1 is a cross sectional view showing an apparatus for manufacturing a skin-covered article according to the present invention, an upper mold and a lower mold being separated.

FIG. 1 shows an apparatus for manufacturing a skin-covered article according to the present invention. The apparatus comprises an upper mold 1 and a lower mold 2 which define a cavity for foaming. The upper mold 1 includes an upper wall 4 having a passage 3 for supplying foam resin and a first peripheral wall 5 extended downward from the upper wall 4 for defining the periphery of the cavity. A second peripheral wall 6 is extended from the lower portion of the first peripheral side wall 5. Also, an enclosing projection 7 is formed on the lower portion. The lower mold 2 includes an upper wall 8 and a peripheral portion 9 having a vertical wall 9a extended downward from the upper wall 8 and bottom wall 9b extended outward from the lower portion of the vertical wall 9a. The peripheral portion 9 is L-shaped in vertical cross section. A skin member 10 is placed on the lower mold 2.

Figure 2:
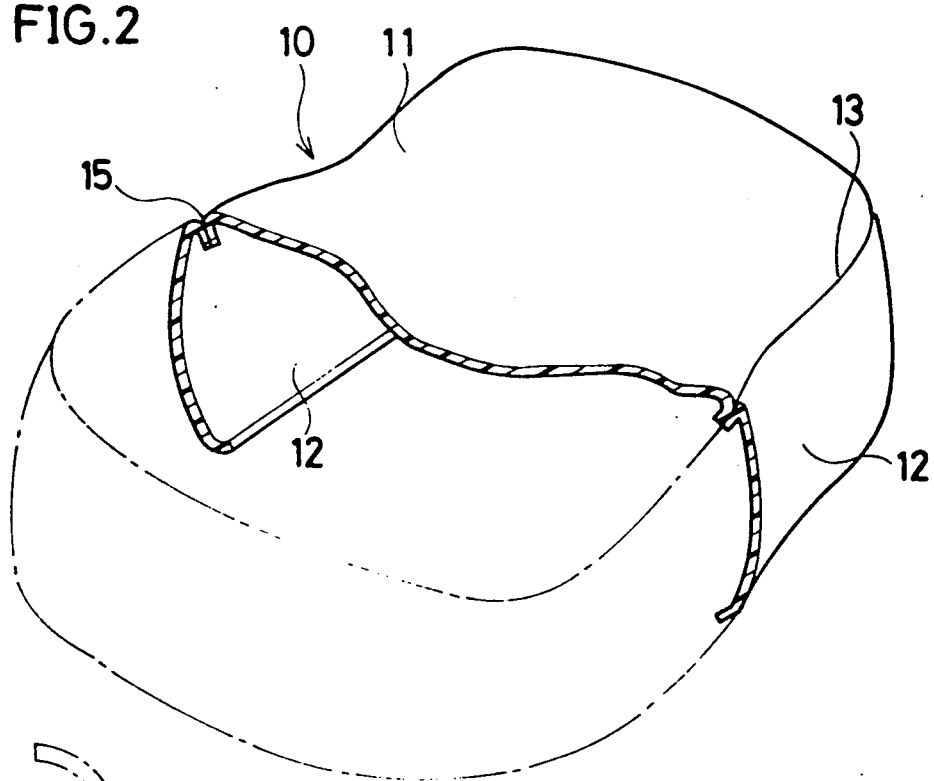
FIG. 2 is a perspective view showing a skin member, a part being removed.
Figure 3:
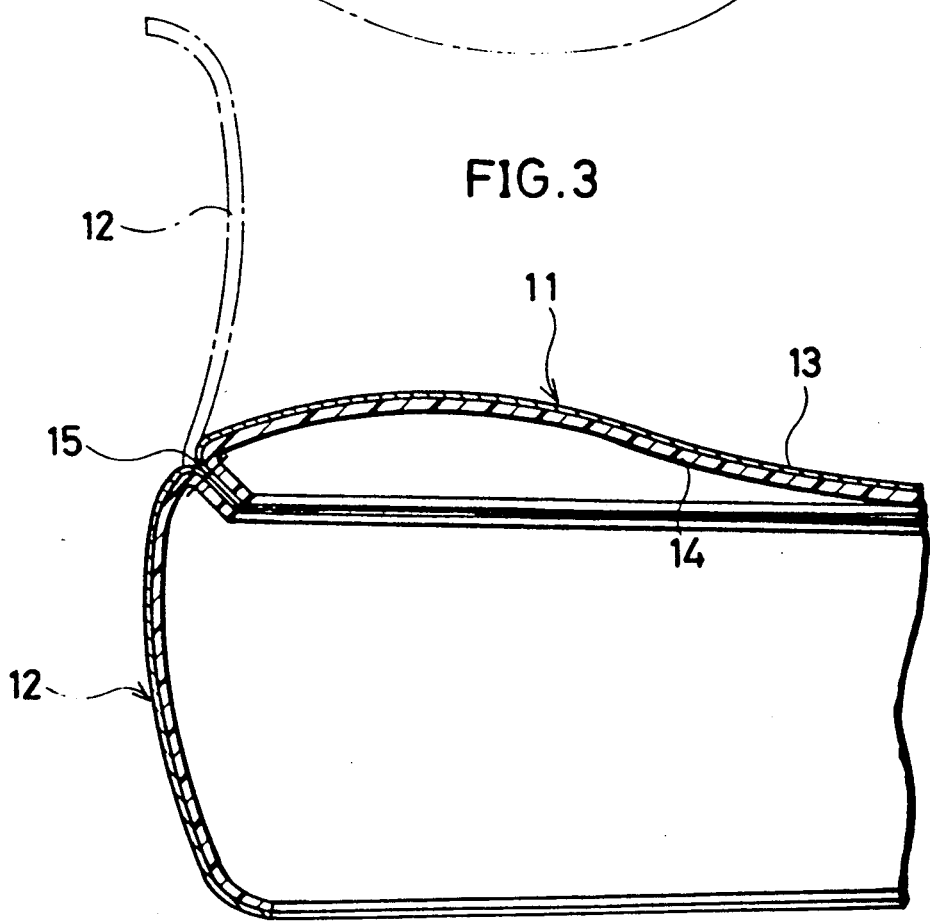
FIG. 3 is an enlarged sectional view showing a portion of the skin member.

As shown in FIG. 2, the skin member 10 comprises a top portion 11 serving as a sitting plate of a seat and a side portion 12 stitched or welded to a peripheral edge of the top portion 11. As shown in FIG. 3, the top portion 11 and the side portion 12 respectively include a surface layer 13 made of fabric such as moquette, artificial leather or the like, and wadding layer 14 made of polyurethane foam, polyethylene foam, polypropylene foam, ABS foam or the like. The wadding layer 14 is fixed on the inside of the surface layer 13 by a frame laminate method or adhesive.

The side portion 12 is folded upward around a connecting portion 15 with the top portion 11 as shown by a phantom line in FIG. 3. As shown in FIG. 1, the skin member 10 is placed on the lower mold 2 with the back surface outside. Specifically, the upper wall 8 and the vertical wall 9a of the peripheral portion 9 have sizes and shapes corresponding to the top portion 11 and the side portion 12 of the skin member 10. The skin member 10 is placed on the lower mold 2 so as to cover the upper wall 8 and the vertical wall 9a. The connecting portion 15 of the top portion 11 and the side portion 12 of the skin member 10 is positioned at the peripheral edge of the upper wall 8. Consequently, the skin member 10 is set on the lower mold.

The second peripheral wall 6 of the upper mold 1 encloses the vertical wall 9a of the peripheral portion 9 of the lower mold 2 when coupling as described below. In addition, the lower end of the second peripheral wall 6 comes in contact with the bottom wall 9b of the peripheral portion 9 when coupling. Consequently, a space 16 is formed between the peripheral portion 9 of the lower mold 2 and the second peripheral wall 6 of the upper mold 1 (See FIG. 4). The side portion of the skin member 10 is held in the space 16 during closing. A sealing member 17 for sealing the space 16 is provided between the lower end of the second peripheral wall 6 of the upper mold 1 and the bottom wall 9b of the peripheral portion 9 of the lower mold 2.

The passage 3 formed in the upper wall 4 of the upper mold 1 has a lower portion 3a slanted at a predetermined angle. The enclosing projection 7 of the upper mold 1 faces the peripheral edge of the upper wall 8 of the lower mold 2. The enclosing projection has such a height as to press the peripheral edge of the top portion 11 of the skin member 10 against the upper wall 8 when coupling. In other words, the enclosing projection 7 has such a height as to form a gap between the lower end of the enclosing projection 7 of the upper mold 1 and the upper wall 8 of the lower mold 2 when coupling. The gap is smaller than the thickness of the skin member 10, for example, about 1 mm. The skin member 10 is pressed against the upper wall 8 of the lower mold 2.

Figure 4:
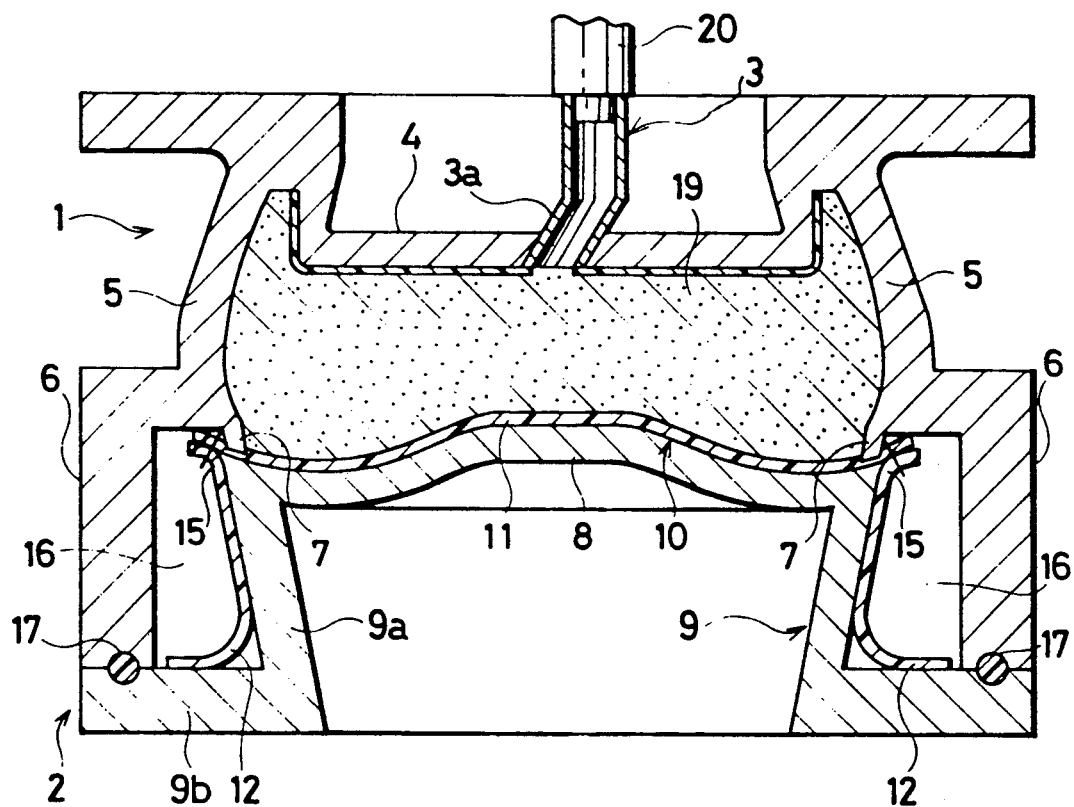
FIG. 4 is a cross sectional view showing the apparatus, the upper mold and the lower mold being coupled and a pad member being molded.

There will be described a method for manufacturing a skin-covered article using the apparatus mentioned above. As shown in FIG. 1, the skin member 10 is reversed outer surface inside, turned upside down, and then placed on the lower mold 2 so as to cover the upper wall 8 and the vertical wall 9a of the peripheral portion 9. The connecting portion 15 of the top portion 11 and the side portion 12 is positioned at the peripheral edge of the upper wall 8 of the lower mold 2. In such a way, the skin member 10 is set on the appropriate position of the lower mold 2. A reinforcement lining 18 is provided on the underside of the upper wall 4 of the upper mold 1, if required. Thereafter, the upper and lower molds 1 and 2 are coupled as shown in FIG. 4. Consequently, a cavity 19 for foaming is defined by the upper wall 4 and the first peripheral wall 5 of the upper mold 1 and the upper wall 8 of the lower mold 2. The skin member 10 is pressed against the upper wall 8 of the lower mold 2 by the enclosing projection 7 of the upper mold 1. In addition, the space 16 is defined by the second peripheral wall 6 of the upper mold 1 and the peripheral portion 9 of the lower mold 2. The space 16 is sealed by the sealing members 17. The side portion 12 of the skin member 10 is housed in the space 16.

Next, a supply pipe 20 communicated with a supply unit (not shown) is connected to the passage 3 of the upper mold 1. Foam resin for the pad member is introduced from the supply pipe 20 into the cavity 19 through the passage 3. At the time of introduction, the flowing direction of the foam resin is changed in the slant portion 3a of the passage 3, so that the flow velocity of the foam resin is lowered due to an increase of flow resistance. Consequently, the foam resin is supplied into the cavity 19 with being diffused. The foam resin supplied in the above-mentioned way is formed into a pad member 21 integrally with the top portion 11 of the skin member 10. Specifically, a part of the foam resin penetrates into the wadding layer 14 of the top portion 11, and thereby the pad member 21 is bonded integrally with the top portion 11.

Figure 5:
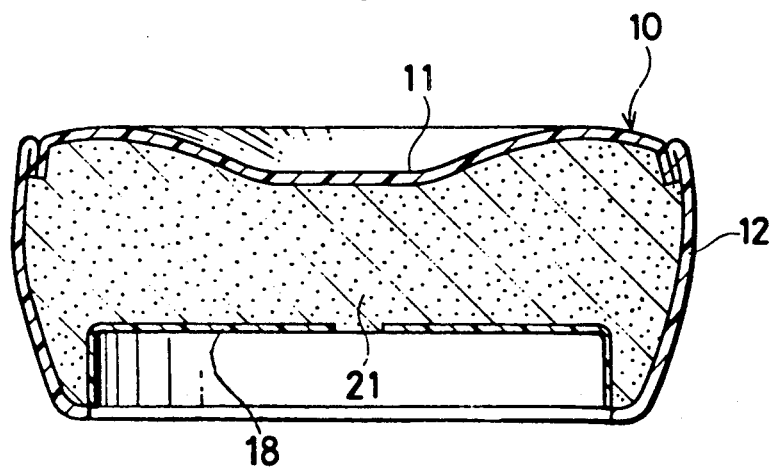
FIG. 5 is a cross sectional view showing a skin-covered article manufactured by the apparatus.

The pad member 21 thus formed is removed from the upper and lower molds 1 and 2 together with the skin member 10. Thereafter, the side portion 12 of the skin member 10 is folded downward and fastened to the periphery of the pad member 21 to form a seat member as shown in FIG. 5. The skin-covered seat member thus formed is attached to a seat frame of a car (not shown) or the like to construct a seat.

As mentioned above, the lower mold 2 of the mold assembly has the upper wall 8 for defining the bottom of the foaming cavity 19 and the peripheral portion 9 extending downward. The reversed skin member 10 is placed on the lower mold 2 so as to cover the upper wall 8 and the vertical wall 9a of the peripheral portion 9. The connecting portion 15 of the skin member 10 is positioned at a corner portion between the upper wall 8 and the vertical wall 9a. Therefore, it will be seen that the skin member 10 can be set on the lower mold 2 more easily and accurately. The enclosing projection 7 is formed on the upper mold 1 of the mold assembly so as to press the periphery of the top portion 11 against the upper wall 8 of the lower mold 2 when coupling. Therefore, it will be seen that the skin member 10 can be fixed on the lower mold 2 simultaneously with the coupling. Also, it will be seen that the foam resin for pad member can be supplied without displacing the skin member 10 from the appropriate position.

At the time of coupling, the space 16 for housing the side portion 12 of the skin member 10 is defined by the second peripheral wall 6 of the upper mold 1 and the peripheral portion 9 of the lower mold 2. In addition, the space 16 is sealed by the sealing members 17 provided between the second peripheral wall 6 and the peripheral portion 9. Therefore, it will be seen that when the foam resin is supplied into the cavity 19, the inner pressure of the space 16 is increased to effectively prevent the foam resin from entering into the space 16. Accordingly, there is no likelihood that the foam resin enters into the space 16 and then impairs the side portion 12. The pressure of the cavity 19 increases sooner due to the pressure increase of the space 16. Accordingly, the foam resin is prevented from being supplied excessively, and is prevented from excessively penetrating into the wadding layer 14 of the top portion 11. Consequently, the skin member 10 is prevented from having excessive hardness.

In the above embodiment, the lower portion 3a of the passage 3 provided in the upper mold 1 is slanted at a predetermined angle to change the flowing direction of the foam resin and lower the flow velocity so that the foam resin is supplied into the cavity 19 with being diffused. Therefore, it will be seen that the foam resin can be prevented from being fixedly introduced to one portion of the skin member 10. Accordingly, there is an advantage that the foam resin can be uniformly introduced over substantially the entire wadding layer 14 of the top portion 11 to assure a uniform amount of penetrating foam resin and a proper hardness of the skin member 10.

In the above embodiment, the skin member 10 is made of the surface layer 13 such as artificial leather and the wadding layer 14. The skin member may be made of the surface layer 13 and a film layer including urethane film, polyethylene film, polypropylene film or hotmelt film, or a coating layer including polyethylene or polypropylene. Also, a lining member inducing nonwoven fabric, urethane film, polyethylene film, polypropylene film, nylon half or cotton may be provided on the back of the wadding layer 14. In this case, the amount of penetrating foam resin can be adjusted by selecting an appropriate lining member. Therefore, the hardness of the skin member 10 can be requlated more precisely.

As described above, the skin member can be set on the lower mold of the mold assembly easily and accurately. The foam resin is supplied into the foaming cavity with the side portion of the skin member being housed in the housing space sealed by the enclosing projections and the sealing member. Therefore, the pad member can be formed integrally with the top portion of the skin member without damaging and soiling the side portion of the skin member. In addition, the present invention provides a simpler mold assembly structure, and easier operation before supplying foam resin.

Furthermore, it would be understood that the foregoing relates to only the scope of the present invention as defined by the appended claims rather than by the description preceding them, and all changes that fall within metes and bounds of the claims, or equivalence of such metes and bounds are therefore intended to be embraced by the claims.

What is claimed is :

1. A method of manufacturing a skin-covered article having a molded material covered by a skin material which has an inside surface and an outside surface, comprising:

providing an upper mold having a first cavity along with a peripheral wall and a downwardly extending enclosing projection;

providing a lower mold having an upper wall with an outer periphery and a peripheral wall extending downwardly from said outer periphery to form a corner where said peripheral wall joins said upper wall;

forming a skin member having an inside surface, an outside surface, a top portion and a side portion with said top portion being connected to said side portion by connecting means on the inside surface of said skin member;

disposing said skin member over said lower mold with the outside surface of said top portion of said skin member contacting said upper wall, with the outside surface of said side portion of said skin member being next to said peripheral wall and with said connecting means being disposed at said corner;

coupling said upper and lower molds such that said enclosing projection engages the outside surface of said upper portion of said skin member and said first cavity overlies said upper portion of said skin member;

sealing said coupled upper and lower molds utilizing a seal between juxtaposed sections of said upper and lower molds, one of said sections being spaced outwardly from said peripheral wall of said lower mold to form at least a part of a second cavity there-between in which said side portion of said skin is disposed, said second cavity being separated from said first cavity by said engagement between said enclosing projection of said upper mold and said outside surface of said top portion of said skin member;

introducing molding material into said first cavity to form a molded material affixed to the inside surface of said top portion of said skin member;

decoupling said first and second molds and removing said molded material and skin member from said decoupled first and second molds;

folding said side portion of said skin over the sides of said molded material and thereby forming a skin-covered article with said connecting means being disposed on the inside of said skin-covered article.

2. A method according to claim 1, wherein said step of introducing molding material into said first cavity comprises introducing said molding material through an opening in said upper mold which communicates with said first cavity.

3. A method according to claim 1, wherein said molding material is introduced into said first cavity through an opening in an upper wall of said first mold.

4. A method according to claim 3, wherein said upper wall of said first mold is a generally planar wall, and introducing said molding material into said first cavity in a direction which is disposed at an acute angle relative to said generally planar upper wall.

5. A method according to claim 1 further comprising preventing said molding material introduced into said first cavity from entering said second cavity by said engagement between said enclosng projection of said top mold and said outside of said top portion of said skin member.

6. A method according to claim 1 further comprising locating said engagement between said enclosing projection of said top mold and said outside of said top portion of said skin member radially inwardly of said corner where said peripheral wall joins said top wall.

7. A method according to claim 1 further comprising retaining said side portion of said skin member in said second cavity during the step of introducing said molding material into said first cavity, and sealing said second cavity during said step of introducing said molding material into said second cavity by said engagement of said enclosing projection of said top mold against said skin material and said seal between said juxtaposed sections on said upper and lower molds.

8. A method according to claim 1, wherein said step of folding said side portion of said skin over the sides of said molded material comprises folding said side portion about said connecting means.

9. A method according to claim 1 further comprising fastening said folded side portions to said molded material to thereby form said skin-covered article.

10. A method according to claim 1, wherein said coupling of said upper and lower molds effects fixing of said skin member to said lower mold as said enclosing projection of said top mold sealing presses said top portion of said skin material against said upper wall of said lower mold, whereby said skin member is prevented from being displaced as said molding material is introduced into said first cavity.

11. A method according to claim 1, wherein said skin-covered article is a seat cushion.

12. A method of manufacturing a skin-covered article having a molded material covered by a skin material which has an inside surface and an outside surface, comprising:
   providing an upper mold having a first cavity along with a peripheral wall and downwardly extending enclosing projection;
   providing a lower mold having an upper wall with an outer periphery and a peripheral wall extending downwardly from said outer periphery to form a corner where said peripheral wall joins said upper wall;
   forming a skin member having an inside surface, an outside surface, a top portion and a side portion with said top portion being connected to said side portion by connecting means on the inside surface of said skin member;
   disposing said skin member over said lower mold with the outside surface of said top portion of said skin member contacting said upper wall, with the outside surface of said side portion of said skin member being next to said peripheral wall, and with said connecting means being disposed at said corner;
   coupling said upper and lower molds such that said enclosing projection sealingly engages the outside surface of said upper portion of said skin member and said first cavity overlies said upper portion of said skin member;
   sealing said coupled upper and lower molds utilizing a seal between a section of said upper mold and a section of said lower mold; said section of said upper mold being spaced outwardly from said peripheral wall of said lower mold to form a second cavity therebetween in which said side portion of said skin is disposed, said second cavity being sealed from said first cavity by said sealing engagement between said enclosing projection of said upper mold and said outside surface of said top portion of said skin member ;
   introducing molding material into said first cavity to form a molded material affixed to the inside surface of said top portion of said skin member;
   decoupling said first and second molds and removing said molded material and skin member from said decoupled first and second molds;
   folding said side portions of said skin over the sides of said molded material and thereby forming a skin-covered article with said connecting means being disposed on the inside of said skin-covered article.

* * * * *